United States Patent

Akami et al.

[11] Patent Number: 5,815,756
[45] Date of Patent: Sep. 29, 1998

[54] FILM POSITIONING APPARATUS

[75] Inventors: Noboru Akami, Yokohama; Isao Soshi, Tokyo, both of Japan

[73] Assignee: Nikon Corporation, Tokyo, Japan

[21] Appl. No.: 870,266

[22] Filed: Jun. 6, 1997

Related U.S. Application Data

[63] Continuation of Ser. No. 563,549, Nov. 28, 1995, abandoned.

[30] Foreign Application Priority Data

Dec. 15, 1994 [JP] Japan .................................. 6-311970

[51] Int. Cl.⁶ .................................................. G03B 17/00
[52] U.S. Cl. ........................................ 396/440; 396/442
[58] Field of Search ................................ 354/203, 106; 396/310, 319, 440, 442

[56] References Cited

U.S. PATENT DOCUMENTS

| | | | |
|---|---|---|---|
| 4,152,062 | 5/1979 | Kobori | 354/203 |
| 4,685,790 | 8/1987 | Uematsu et al. | 354/203 |
| 5,140,354 | 8/1992 | Burnham | 354/203 |
| 5,307,100 | 4/1994 | Kubo | 354/105 |
| 5,508,768 | 4/1996 | Wakabayashi et al. | 354/106 |
| 5,517,266 | 5/1996 | Funaki et al. | 354/106 |
| 5,519,464 | 5/1996 | Brock et al. | 354/106 |

FOREIGN PATENT DOCUMENTS 0 446 916 A2  9/1991  European Pat. Off. .

*Primary Examiner*—Michael L. Gellner
*Assistant Examiner*—Daniel Chapik

[57] ABSTRACT

A film positioning apparatus includes a camera body assembled with a feeding system for allowing a film to travel in a first direction parallel to its surface and a platen member having external rails for positioning the film in a second direction parallel to the surface thereof but orthogonal to the first direction and connected to the camera body with screws. The platen member is provided with a mounting member for a magnetic head to be disposed in a predetermined positional relationship in the second direction with respect to the film.

5 Claims, 4 Drawing Sheets

FILM POSITIONING APPARATUS

This application is a continuation, of application Ser. No. 08/563,549, filed Nov. 28, 1995, now abandoned.

BACKGROUND OF THE INVENTION

1. Field of the Invention

The present invention relates to a film positioning apparatus for positioning a film such as a roll film, etc.

2. Related Background Art

FIG. 4 is a sectional view illustrating a structure of a mechanism for positioning a film in a conventional camera. A camera body 401 includes internal rails 401a formed in a protruded shape in an incident direction (an arrowed direction A) of a beam of light of an object and external rails formed in the protruded shape in the same direction as that of the internal rails 401a. A platen member 402 provided separately from the camera body 401 is so disposed as to be pushed against the external rails 401b. A position of a film 3 in a crosswise direction (up-and-down directions in the Figure) is determined by the external rails 401b. An unillustrated feed system assembled to the camera body 401 performs winding and rewinding operations, whereby the film 3 is traveled between the internal rails 401a and the platen member 402 in a direction orthogonal to the sheet surface of the drawing. An aperture 401c is formed in the camera body 401 and transmits the light beam by which the film 3 is exposed.

For obtaining a compatibility with other data recording devices and writing an accurate signal, a camera constructed to read and write data from and to a data recording area on the film 3 with a feed of the film 3 has to restrain deviations of a writing position to the data recording area on the film 3 and a signal inclination down to small levels. Take a magnetic recording device for example, a position of the magnetic head with respect to the film 3 and a tilt of a magnetic head with respect to the traveling direction have to fall within specified ranges.

According to a conventional structure as depicted in FIG. 4, however, there is caused an error in the position of the recording device with respect to the film 3 due to a backlash in mounting the camera body 401 and the platen member 402 in addition to a deviation in mounting the magnetic head and the platen member 402 fitted with the magnetic head. Further, an error is also produced in the tilt of the recording device with respect to the traveling direction similarly due to the mounting backlash. Moreover, when adjusting the position of the above recording device, there arises such a problem that an error quantity due to the mounting deviation and the mounting backlash can not be known till the film 3 is actually traveled.

SUMMARY OF THE INVENTION

It is a primary object of the present invention to provide a positioning apparatus capable of enhancing a positioning accuracy by reducing factors for an error caused between a film and a mounting member and reducing a labor for mounting a separate member to the mounting member.

To accomplish the above object, according to an aspect of the present invention, a positioning apparatus comprises a film holding body assembled with a feeding system for allowing a film to travel in a first direction parallel to a surface of the film, a positioning member having positioning portions for positioning the film in a second direction parallel to the surface thereof but orthogonal to the first direction and connecting elements for connecting the positioning member to the film holding body. The positioning member is provided with a mounting member for a separate member to be disposed in a predetermined positional relationship in the second direction with respect to the film.

A surface position of the film is determined between the film holding body and the positioning member.

If a position of the separate member is determined with respect to the positioning member before securing the positioning member to the film holding body, the position of the film coincides with the position of the separate member just when securing the positioning member to the film holding body. It is therefore possible to eliminate the error due to a mounting deviation between the film holding body and the positioning member.

According to another aspect of the present invention, a camera comprises a camera body formed with an aperture for exposing a film and a positioning member having positioning portions for positioning the film fed to the exposure aperture in a crosswise direction parallel to a surface of the film. The positioning member is connected to the camera body though connecting elements. The positioning member has a mounting member for a separate member to be disposed in a predetermined positional relationship in the crosswise direction with respect to the film.

In the thus constructed camera, if a position of the separate member is determined with respect to the positioning member before securing the positioning member to the camera body, the position of the film coincides with the position of the separate member just when securing the positioning member to the camera body. Therefore, an error due to the mounting deviation between the camera body and the positioning member can be eliminated. In this camera, the positioning member is provided with a light shielding member for covering the exposure aperture of the camera body.

In the relevant camera, rail surfaces set in a face-to-face relationship with the film surface are provided along a periphery of the exposure aperture of the camera body, and a surface position of the film can be determined by the rail surfaces and the light shielding member.

The surface position of the film is determined based on this construction, or the light shielding member for covering the exposure aperture and the positioning portions are assembled into the positioning member, and hence the positioning portions can be provided separately from the camera body without increasing the number of parts.

In the above camera, a data transmitting device for performing a data transmission with respect to a data recording portion formed on the film is mounted to the mounting member. The data transmitting device is positioned with respect to the positioning portions and mounted to the mounting member, and, thereafter, the mounting member is secured to the camera body. With this arrangement, the data transmitting device is disposed in the predetermined position in the crosswise direction with respect to the film. Further, the data transmitting device can be disposed in the predetermined position with respect to the film simply by its being positioned with respect to the positioning portions. An error caused by a mounting backlash between the positioning member and the camera body is eliminated, thereby reducing a labor for the positional adjustment.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENT

One embodiment in which the present invention is applied to a camera will be described with reference to FIGS. 1 to 3.

Figure 1:
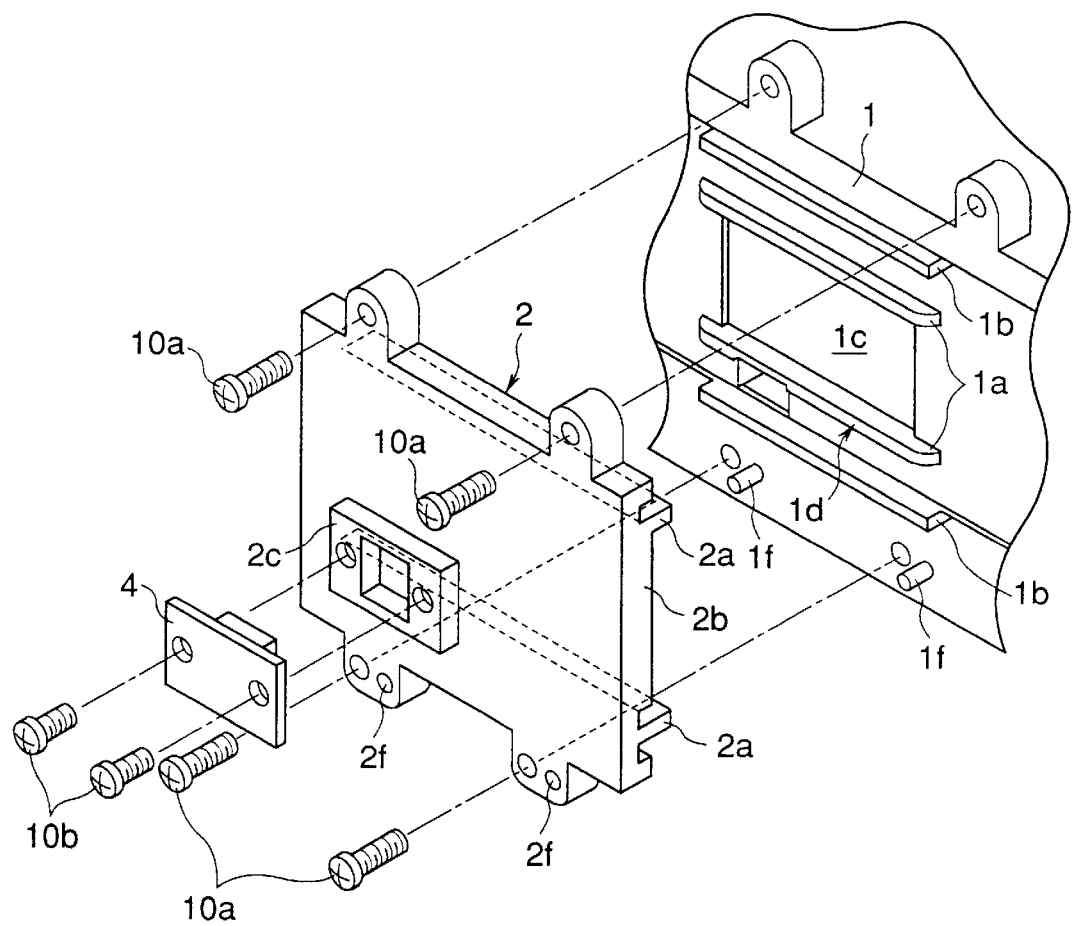
FIG. 1 is a perspective view illustrating a construction of an embodiment of a positioning apparatus according to the present invention.

FIG. 1 is a perspective view illustrating a positioning apparatus in the embodiment. FIGS. 2 and 3 are sectional views each illustrating a positioning mechanism of FIG. 1. FIG. 2 shows a section steering clear of a mounting member 2c (which will be mentioned later). FIG. 3 shows a section passing through the mounting member 2c. Referring to these Figures, the numeral 1 generally designates a camera body. The camera body 1 is formed with a rectangular aperture 1c for shaping a beam of light of an object that travels through an unillustrated photographing lens. A film guided to this aperture 1c is exposed in accordance with a configuration of the aperture 1c. A pair of internal rails 1a each taking a protruded shape on the side of a platen member 2 are formed above and under the aperture 1c. The internal rails 1a have surfaces 1d in a face-to-face relationship with the platen member 2. Both edges of the surface 1d are located outwardly of short sides of the aperture 1c. Protrusions 1b are formed at outer edges, i.e., upper and lower edges of the pair of internal rails 1a.

The platen member 2 includes a pair of external rails 2a formed in a face-to-face relationship with the camera body 1 and laid so that a dimension of an interval between the rails 2a is substantially equalized to a width of the film. A crosswise position of the film is determined by these external rails 2a. A light shielding member 2b is formed with recessed portions 2d. The platen member 2 has the mounting member 2c on a side opposite to the side where the external rails 2a are formed. A magnetic head 4, i.e., a data transmitting device as a separate member, is secured to this mounting member 2c with screws 10b. Note that the external rails 2a are laid in at least a zone defined by the portions where the aperture 1c and the magnetic head 4 are provided.

Figure 2:
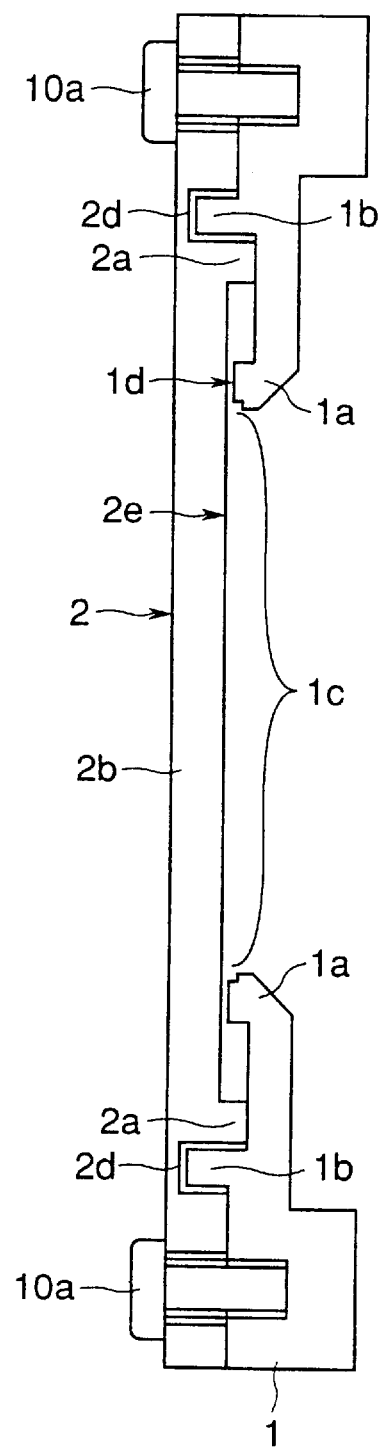
FIG. 2 is a sectional view depicting a positioning mechanism of the positioning apparatus shown in FIG. 1.

As illustrated in FIG. 2, the platen member 2 is mounted to the camera body 1 with screws 10a. On this occasion, however, a mounting position to the camera body 1 is determined by holes 2f (see FIG. 1) formed in the platen member 2 and positioning pins 1f provided on the camera body 1. The arrangement is such that a predetermined gap is formed between the platen member 2 and the internal rails 1a, and the film travels through this gap in a direction orthogonal to the sheet surface. The crosswise position of the film is determined by the external rails 2a, while a surface position of the film is determined by the light shielding member 2b and surfaces 1d of the internal rails 1a.

The protruded portions 1b of the camera body 1 enter the recessed portions 2d of the light shielding member 2b, and the light shielding member 2b serves to prevent an incidence of light beams on the aperture, which beams come from the outside of the photographing lens. A surface 2e of the light shielding member 2b, which contacts the film, is kept in terms of its plane accuracy, thus providing the film contiguous thereto with a flatness.

Figure 3:
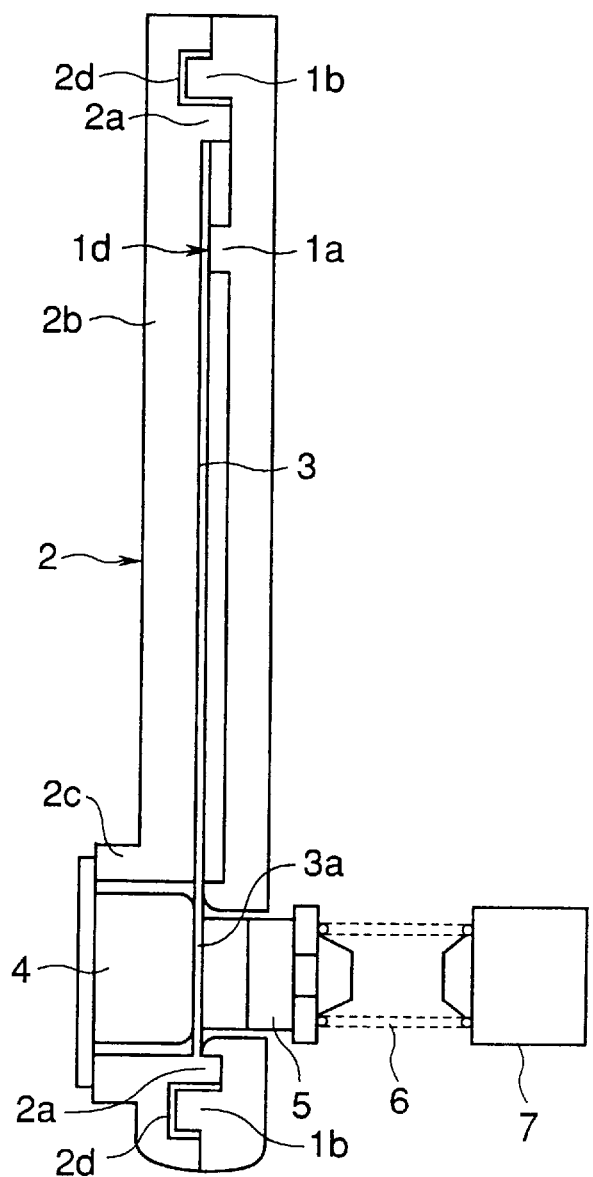
FIG. 3 is a sectional view of the positioning mechanism of the positioning apparatus shown in FIG. 1 but illustrates a section passing through a mounting member.
Figure 4:
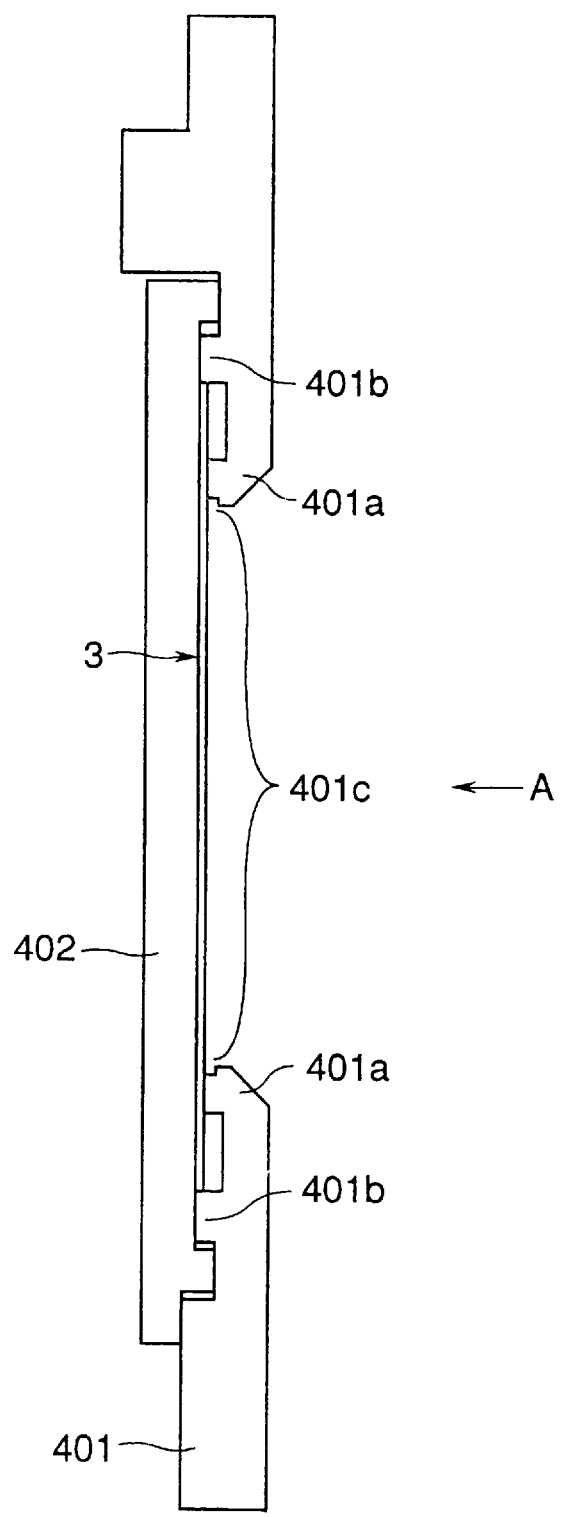
FIG. 4 is a sectional view illustrating a structure of a positioning mechanism for a film in a conventional camera.

A film 3, though not illustrated in FIG. 1, is shown in FIG. 3 for simplifying the explanation. As depicted in FIG. 3, the magnetic head 4 performs a data transmission with respect to a magnetic layer 3a of the film 3 traveling in the gap between the internal rails 1a and the light shielding member 2b. A pad 5 thrust by a biasing spring 6 towards the magnetic head 4 is disposed in a face-to-face position with the magnetic head 4. The film 3 is brought into a close contact with the magnetic head 4 through the pad 5. A fixing member 7 serves to receive the biasing spring 6. For adjusting the crosswise position for the film 3, the magnetic head 4 is positioned with respect to the external rails 2a and mounted to the mounting member 2c.

In accordance with this embodiment, the film 3 is positioned by the external rails 2a provided on the platen member 2, and hence, after the magnetic head 4 has been positioned with respect to the external rails 2a and then mounted to the platen member 2, the platen member 2 is secured to the camera body 1. Thus, the magnetic head 4 is disposed in a predetermined position in the crosswise direction with respect to the film 3. Further, when adjusting the position of the magnetic head 4, it may suffice that the position of the magnetic head 4 is adjusted with respect to the external rails 2a, thereby reducing labor for the adjustment.

In the embodiment discussed above, the data transmission to the film is effected by use of the magnetic head 4 but may involve the use of other data transmitting devices, e.g., an optical recording device, etc. Further, the external rails 2a are consecutive rails extending over the zone where the aperture 1c and the magnetic head 4 are provided but are not necessarily consecutive if they regulate a crosswise deviation of the film. The external rails may be such that a plurality of protruded portions each taking the same configuration are arranged in one straight line.

It is apparent that, in this invention, a wide range of different working modes can be formed based on the invention without deviating from the spirit and scope of the invention. This invention is not restricted by its specific working modes except being limited by the appended claims.

What is claimed is:

1. A camera comprising:

a camera body formed with an aperture to expose a film; and a connecting mechanism; and a positioning member having positioning portions to position the film fed to said exposure aperture in a crosswise direction parallel to a surface of the film, said positioning member being connected to said camera body through said connecting mechanism wherein said positioning member has a mounting member for a separate member to be disposed in a predetermined positional relationship in the crosswise direction with respect to the film, and wherein said positioning member and said camera body include portions that interlock to prevent stray light from impinging on the film.

2. A camera according to claim 1, wherein said positioning member is provided with a light shielding member for covering said exposure aperture of said camera body.

3. A camera according to claim 2, wherein rail surfaces set in a face-to-face relationship with the film surface are provided along a periphery of said exposure aperture of said camera body, and a surface position of the film is disposed by the rail surfaces and said light shielding member.

4. A camera according to claim 1, wherein a data transmitting device for performing a data transmission with respect to a data recording portion formed on the film is mounted to said mounting member.

5. A film positioning apparatus, comprising:

a film holding body, including internal rails, protruding portions, and side walls defining an aperture that admits light;

a platen member including external rails to determine a crosswise position of a film, wherein the external rails extend over a zone of the aperture, a light shielding portion that determines in combination with the internal rails a surface position of the film, and recessed portions that in combination with the protruding portions serve to keep stray light from impinging upon said film; and a magnetic head disposed so as to protrude through a hole in the platen member to contact the film in a predetermined location.

* * * * *

UNITED STATES PATENT AND TRADEMARK OFFICE
CERTIFICATE OF CORRECTION

PATENT NO.:  5,815,756
DATED     :  September 29, 1998
INVENTOR(S): Noboru AKAMI, et al.

It is certified that error appears in the above-identified patent and that said Letters Patent is hereby corrected as shown below:

Column 4,  line 57 to Column 5, line 6, (claim 1), replace with
--A camera comprising:
a camera body formed with an aperture to expose a film; and
a connecting mechanism; and
a positioning member having positioning portions, to position the film fed to said exposure aperture in a crosswise direction parallel to a surface of the film, said positioning member being connected to said camera body through said connecting mechanism,
wherein said positioning member has a mounting member for a separate member to be disposed in a predetermined positional relationship in the crosswise direction with respect to the film, and
wherein said positioning member and said camera body include portions that interlock to prevent stray light from impinging on the film.

UNITED STATES PATENT AND TRADEMARK OFFICE
CERTIFICATE OF CORRECTION

PATENT NO.: 5,815,756
DATED : September 29, 1998
INVENTOR(S): Noboru AKAMI, et al.

It is certified that error appears in the above-identified patent and that said Letters Patent is hereby corrected as shown below:

Column 6, lines 1-16, (claim 5) replace with
--A film processing apparatus, comprising:
a film holding body, including internal rails, protruding portions, and side walls defining an aperture that admits light;
a platen member including external rails to determine a crosswise position of a film, wherein the external rails extend over a zone of the aperture, light shielding portion that determines in combination with the internal rails a surface position of the film, and recessed portions that in combination with the protruding portions serve to keep stray light from impinging upon said film; and
a magnetic head disposed so as to protrude through a hole in the platen member to contact the film in a predetermined location.

Signed and Sealed this

Sixteenth Day of March, 1999

Attest:

Q. TODD DICKINSON

Attesting Officer

Acting Commissioner of Patents and Trademarks